United States Patent
Uwami et al.

[11] Patent Number: 5,853,924
[45] Date of Patent: Dec. 29, 1998

[54] METHOD OF MANUFACTURING COLOR FILTERS

[75] Inventors: Katsutoshi Uwami; Toshiyuki Teshirogi; Hideharu Watanabe; Tatsuya Moriike, all of Fukushima-ken, Japan

[73] Assignee: Alps Electric Co., Ltd., Tokyo, Japan

[21] Appl. No.: 868,656

[22] Filed: Jun. 4, 1997

Related U.S. Application Data

[63] Continuation of Ser. No. 575,274, Dec. 20, 1995, abandoned.

[30] Foreign Application Priority Data

Dec. 26, 1994 [JP] Japan .................................. 6-322437
Oct. 25, 1995 [JP] Japan .................................. 7-277983

[51] Int. Cl.⁶ .......................... G02B 5/20; G02F 1/1335
[52] U.S. Cl. ...................... 430/7; 430/945; 219/121.69
[58] Field of Search ............................. 430/7, 321, 945; 349/106, 110; 219/121.69

[56] References Cited

U.S. PATENT DOCUMENTS

| | | | |
|---|---|---|---|
| 5,340,619 | 8/1994 | Chen et al. | 424/498 |
| 5,401,616 | 3/1995 | Isomi et al. | 430/7 |
| 5,684,553 | 11/1997 | Fukuchi et al. | 349/110 |

FOREIGN PATENT DOCUMENTS

| | | |
|---|---|---|
| 2-092476 | 4/1990 | Japan . |
| 4-306601 | 10/1992 | Japan . |
| 5-203807 | 8/1993 | Japan . |
| 7-294725 | 11/1995 | Japan . |

OTHER PUBLICATIONS

Grum et al., "Optical Radiation Measurements" vol. 1, pp. 145–149 (1979).
Translation of JP 5-203807, "Color Filter Manufacturing Method", Fukuchi et al. (Aug. 1993).

*Primary Examiner*—John A. McPherson
*Attorney, Agent, or Firm*—Brinks Hofer Gilson & Lione

[57] ABSTRACT

A color filter is manufactured in the steps described below. ① A plurality of transparent electrodes which extend in a straight line at fixed pitch intervals are formed on one surface of a transparent board: ② color filters of a plurality of colors are stacked on transparent electrodes in a predetermined sequence: ③ a high energy beam is scanned at fixed pitch intervals in a direction intersecting at right angles to the extension direction of the transparent electrodes in order to selectively remove the transparent electrodes and the color filters, or only the color filters: ④ a black resist is coated onto that surface of the transparent board where the transparent electrodes are formed, light for exposing the black resist is irradiated from the back of the transparent board, and the black resist layer coated onto an area other than the color filter formation portion is exposed: ⑤ the exposed transparent board is developed to selectively remove the unexposed black resist coated on the color filters, and thus a light-shielding film is formed around the color filter. In this case, when the unexposed black resist is removed by using laser light with a short wavelength of 380 nm or less as the high energy beam, removal at the same width is made possible regardless of the color of the color filters, and processing quality is improved.

5 Claims, 6 Drawing Sheets

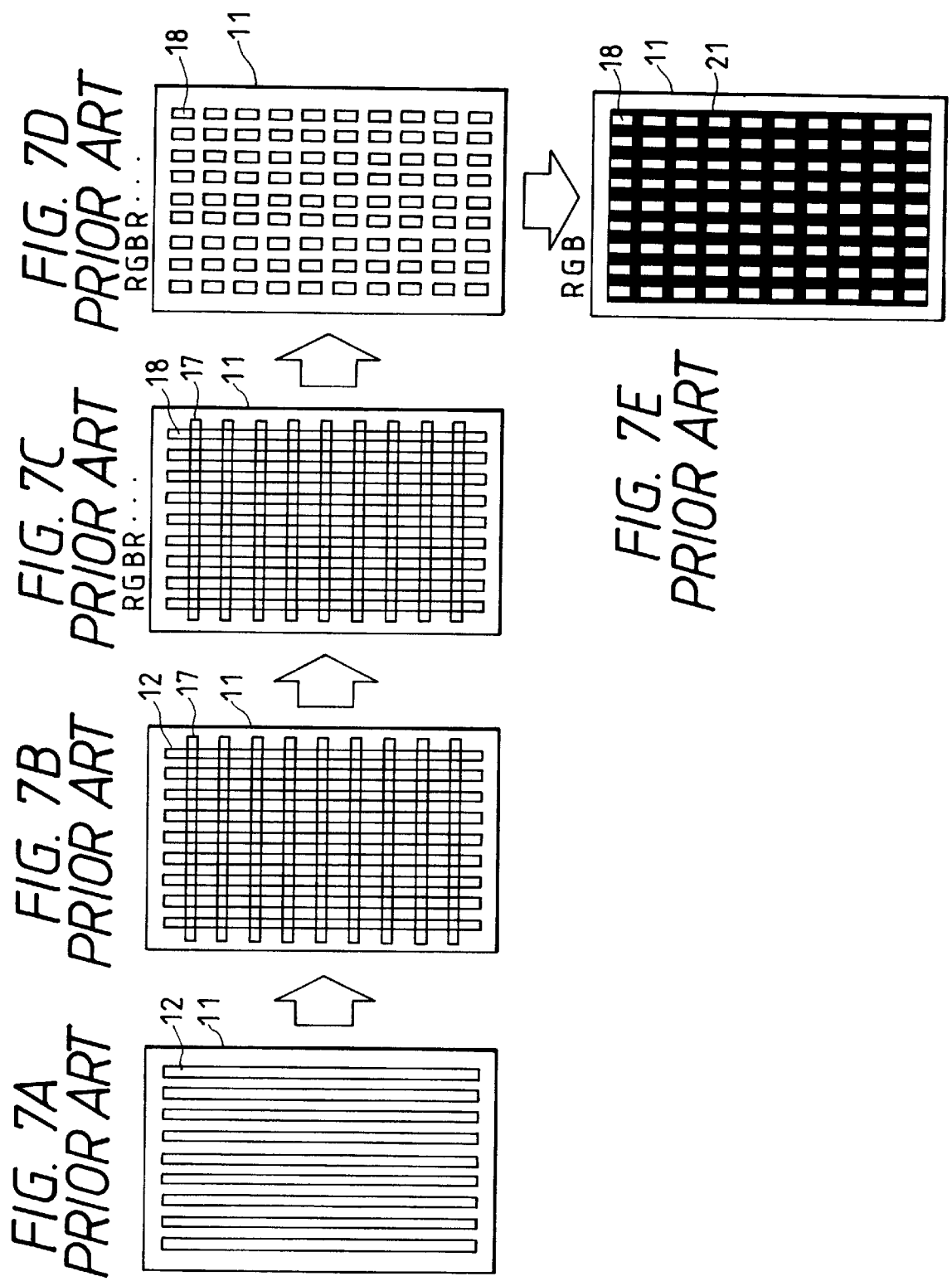

METHOD OF MANUFACTURING COLOR FILTERS

This application is a continuation of application Ser. No. 08/575,274, filed Dec. 20 1995 now abandoned.

BACKGROUND OF THE INVENTION

1. Field of the Invention

The present invention relates to a method of manufacturing color filters for use in a liquid-crystal display device for making a full color display and, more particularly, to a method of forming a light-shielding film to be formed around a color filter formation portion.

2. Description of the Related Art

Hitherto, a technique is known by which a light-shielding film is formed in the gap portion of color filters in order to eliminate stray light, and display quality is improved.

Referring to FIGS. 7 to 11, an example of a method of manufacturing a color filter with a light-shielding film, which has hitherto been proposed, will be described below.

① As shown in FIG. 7A, a plurality of transparent electrodes 12 which extend in a straight line at fixed pitch intervals are formed on one surface of a transparent board 11.

② As shown in FIG. 8, a photo resist is coated onto an area including at least the area in which the transparent electrodes 12 are formed from among the transparent electrode formation surface of the transparent board 11. This photo resist is dried to form a photo resist layer 13.

③ In parallel with the above step, as shown in FIG. 9, a mask 15 having a plurality of slits (light transmission portions) 14 which extend in a straight line at fixed pitch intervals is manufactured.

④ As shown in FIG. 10, the mask 15 is stacked on a black resist layer 13 with the extension direction of the slits 14 intersecting at right angles to the extension direction of the transparent electrodes 12, and exposure light 16 is irradiated from the mask 15 side to the photo resist layer 13. After a proper time, this exposed transparent board 11 is developed to selectively remove the unexposed photo resist. As a result, as shown in FIG. 7B, transverse stripes 17 which cross on the transparent electrodes 12 are formed.

⑤ Color filters 18 for R (red), G (Green), and B (Blue), which are the three primary colors, are stacked on each of the plurality of transparent electrodes 12 exposed from the transverse stripes 17 in a predetermined sequence by using an electrodeposition method, a dyeing method, or a print method. In an example of FIG. 7C, the color filters 18 are stacked in the following order: R, G, B, R, G, B, R, G . . . for each of the transparent electrodes 12 arrayed from side to side and adjacent to each other. After stacking, the color filters 18 are calcined at approximately 250° C. and solidified.

⑥ Prior to the formation of a light-shielding film, the transverse stripes 17, which become obstacles when forming the light-shielding film, are peeled off. The peeling off of the transverse stripes 17 is performed by brushing the surfaces of the transverse stripes 17 while showering an alkali solution of caustic soda or the like onto the transverse stripe formation surface. As a result, as shown in FIG. 7D, the color filters 18 having no light-shielding film are obtained.

⑦ As shown in FIG. 11, a photo resist containing black pigments is coated onto an area including at least the area in which the color filters 18 are formed from among the color filter formation surface of the transparent board 11. This photo resist is dried to form a black resist layer 19.

⑧ Also, as shown in FIG. 11, exposure light 20 is irradiated onto the black resist layer 19 from the back of the transparent board 11. After a proper time, this exposed transparent board 11 is developed to selectively remove the unexposed black resist. As a result, as shown in FIG. 7E, a light-shielding film 21 is formed in the gap portion of the color filters 18.

In the above-described conventional method of manufacturing color filters, since the transverse stripes 17 are formed of such photo resist, when forming the light-shielding film 21, two times of exposure and development of the photo resist (for the photo resist layer 13 and for the black resist layer 19) must be performed. Therefore, the manufacturing steps become complex, and the cost of manufacturing color filters increases.

Also, although the heat-resistance temperature of the photo resist is generally 150° C. or thereabouts, the transverse stripes 17 are heated up to approximately 250° C. when the color filters 18 are calcined. Therefore, the photo resist is likely to adhere to the surface of the transparent board 11, and even if the photo resist is brushed while showering an alkali solution thereto, it is difficult to completely remove the photo resist. Since the exposed photo resist changes its color to gray, if the transverse stripes 17 are left to remain in the gap portion of the color filters 18, the black resist layer 19 in the portion in which the transverse stripes remain is underexposed when the black resist layer 19 is exposed. Because of this, a clear light-shielding film 21 is not formed in the gap portion of the color filters 18, and manufacturing color filters having excellent display quality becomes difficult.

SUMMARY OF THE INVENTION

The present invention has been achieved to solve such drawbacks of the prior art. It is an object of the present invention to provide a method of manufacturing color filters having excellent display quality at a low cost.

It is another object of the present invention to provide a method of manufacturing color filters for Red (R), Green (G), and Blue (B) such that the removal widths thereof are not different for each color.

It is a further object of the present invention to provide a liquid-crystal display device which is capable of making an excellent color display by using color filters obtained by such manufacturing method.

To achieve the above-described objects, according to one aspect of the present invention, there is provided a method of manufacturing color filters, the method comprising the steps of: forming a plurality of transparent electrodes which extend in a straight line at fixed pitch intervals on one surface of a transparent board; stacking color filters of a plurality of colors in a predetermined sequence on the transparent electrodes; scanning a high energy beam at fixed pitch intervals in a direction intersecting the extension direction of the transparent electrodes, and selectively removing the transparent electrodes and color filters stacked thereon; coating a black resist onto that surface of the transparent board where transparent electrodes are formed; irradiating light for exposing the black resist from the back of the transparent board in order to expose the black resist coated in an area other than the color filter formation area; and developing the exposed transparent board in order to selectively remove the unexposed black resist coated on the color filters, and forming a light-shielding film around the color filters.

According to another aspect of the present invention, the method of manufacturing color filters comprises a step of selectively removing only the color filters stacked on the transparent electrodes when a high energy beam is scanned in place of a step of removing both the transparent electrodes and the color filters stacked thereon.

To achieve the above-described objects, according to a further aspect of the present invention, there is provided a method of manufacturing color filters, the method comprising the steps of: forming a plurality of transparent electrodes in a straight line at fixed pitch intervals on one surface of a transparent board; stacking color filters of a plurality of colors in a predetermined sequence on the plurality of transparent electrodes; forming a plurality of color filter elements spaced from each other on the transparent board by scanning and irradiating laser light with a wavelength of 380 nm or less onto the plurality of transparent electrodes at a fixed pitch from a direction intersecting at right angles to the plurality of transparent electrodes and by selectively removing the plurality of color filter elements; and forming a light-shielding film formed of a black resist around the color filter elements.

To achieve the above-described objects, according to a further aspect of the present invention, a liquid-crystal display device comprises color filters obtained by the color filter manufacturing method.

When a high energy beam, such as a laser beam, an electron beam or an ion beam, is irradiated, thermal deformation (melting, evaporation or sublimation) occurs on the color filters and the electrodes which are the substrates thereof due to the heat of the beam, and the color filters and the electrodes can be removed. By adjusting the level of the energy, only the color filters can be removed, or both the color filters and the transparent electrodes can be removed.

As described above, when the color filters, the transparent electrodes, or an unwanted portion of the color filters are removed by irradiating a high energy beam, the exposing and developing processes of the photo resist may be managed by performing only the exposing and developing processes of the black resist layer. Thus, the manufacturing steps can be simplified, and the cost of manufacturing color filters can be reduced.

Also, since the problem with the printing of the photo resist in the gap portion of the color filters does not occur, it is possible to form a clear light-shielding film in the gap portion of the color filters, making it possible to manufacture a color filter having excellent display quality.

According to the above-described means, when color filters for Red (R), Green (G), and Blue (B) are partially removed by common laser light, laser light with a short wavelength, to be specific, laser light with a short wavelength of 380 nm or less, is used. Therefore, as shown in FIG. 5, the light transmittance of such laser light with a short wavelength with respect to the color filter elements for Red (R), Green (G), and Blue (B) are each about 10% or less, and the laser light with a short wavelength of 380 nm or less are substantially uniformly reflected in the color filter elements for Red (R), Green (G), and Blue (B).

As described above, according to the above-described means, the removal (cutting) width with respect to the color filter elements for Red (R), Green (G), and Blue (B) by the laser light with a short wavelength of 380 nm or less is the same. As a result, the sizes of the color filter elements for Red (R), Green (G), and Blue (B) are the same. Therefore, the processing quality of the color filters is not reduced, and color filters having excellent display quality can be manufactured.

When manufacturing color filters, use, as laser light, of a third or fourth harmonic of light obtained from a YIG laser, or laser light obtained from an excimer laser, in particular, laser light with a short wavelength of 280 nm or less, makes it possible to obtain excellent processing quality such that the boundary between a processing region and a non-processing region is clear due to the fact that the wavelength of the laser light is short in addition to the effect achieved by the above-described means.

According to the above-described means, since the processing quality of color filters used is excellent, it is possible to reproduce an image having excellent display quality as well.

The above and further objects, aspects and novel features of the invention will become more apparent from the following detailed description when read in connection with the accompanying drawings.

BRIEF DESCRIPTION OF THE DRAWINGS

FIGS. 7A, 7B, 7C, 7D, and 7E are illustrations of steps of manufacturing color filters according to the prior art;

DESCRIPTION OF THE PREFERRED EMBODIMENTS

[First Embodiment]

Figure 1:
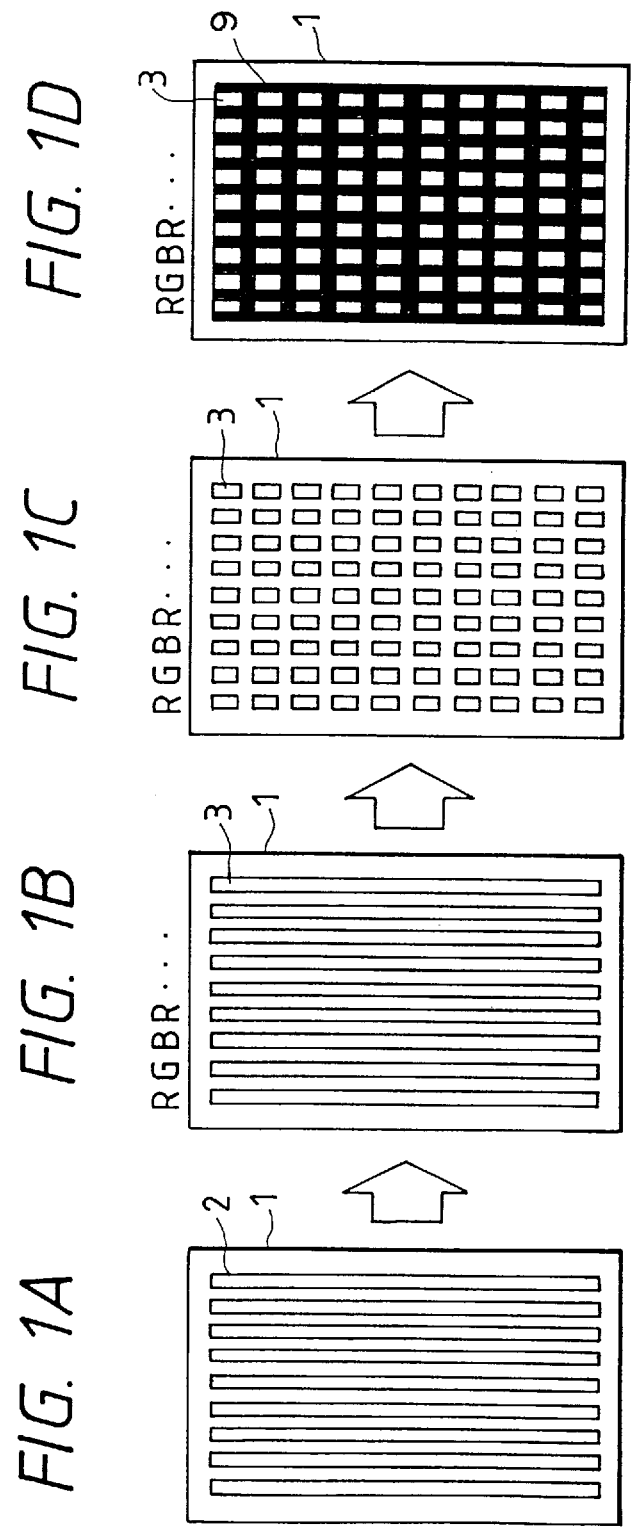
FIGS. 1A, 1B, 1C, and 1D are illustrations of steps of manufacturing color filters in accordance with a first embodiment of the present invention.

A method of manufacturing color filters in accordance with a first embodiment of the present invention will be described with reference to FIGS. 1 to 3. The method of manufacturing color filters of this embodiment is carried out in the following sequence.

① As shown in FIG. 1A, a plurality of transparent electrodes 2 which extend in a straight line at fixed pitch intervals are formed on one surface of a transparent board 1. The transparent electrodes 2 can be formed by patterning ITO.

② As shown in FIG. 1B, color filters 3 of R (Red), G (Green), and B (Blue), which are the three primary colors, are stacked in a predetermined sequence by using an electrodeposition method, a dyeing method, or a print method on each of the transparent electrodes 2. In an example of FIG. 1B, the color filters 3 are stacked in the following order: R, G, B, R, G, B, R, G . . . for each of the transparent electrodes 2 arrayed from side to side and adjacent to each other. After stacking, the color filters 3 are calcined at approximately 250° C. and solidified.

Figure 2:
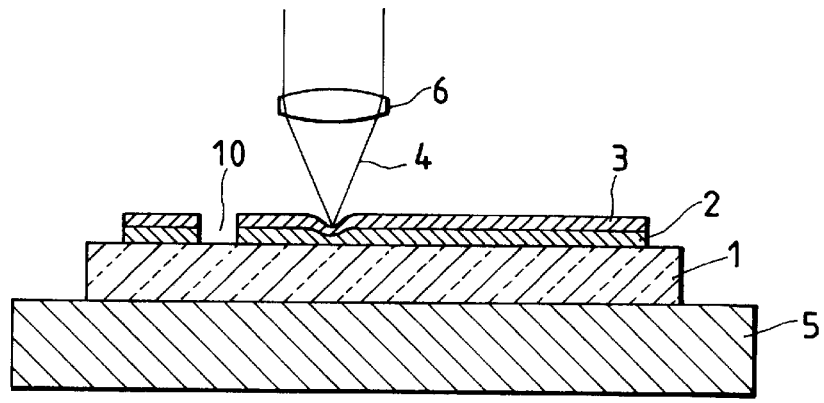
FIG. 2 is a sectional view of the essential portion showing a state in which a high energy beam is scanned.

③ As shown in FIG. 2, a high energy beam 4, such as a laser beam, an electron beam, or an ion beam, is scanned at fixed pitch intervals in a direction intersecting the extension direction of the transparent electrodes 2, more preferably, in a direction intersecting at right angles thereto. As a laser beam, a second harmonic (wavelength: 532 nm, and color: green type) of laser light obtained from a solid YIG laser is used. As a result, thermal deformation (melting, evaporation or sublimation) is made to occur on the transparent electrodes 2 and the color filters 3, and the transparent electrodes 2 and the color filters 3 in the portion irradiated with the high energy beam are removed. The irradiation of the high energy beam 4 to the transparent board 1 may be performed by using an appropriate apparatus as required. As a particularly preferable apparatus, an apparatus shown in FIG. 2 is possible which has disposed therein a movable table 5 on which the transparent board 1 is mounted and an irradiation head 6 for irradiating a high energy beam so as to face each other and which intermittently drives the movable table 5 in the extension direction of the transparent electrodes 2 at fixed pitch intervals and which drives the high energy beam irradiation head 6 in a direction intersecting at right angles to the direction in which the movable table 5 is driven in synchronization with the intermittent driving of the movable table 5. As a result, as shown in FIG. 1C, a color filter having no light-shielding film is obtained.

Figure 3:
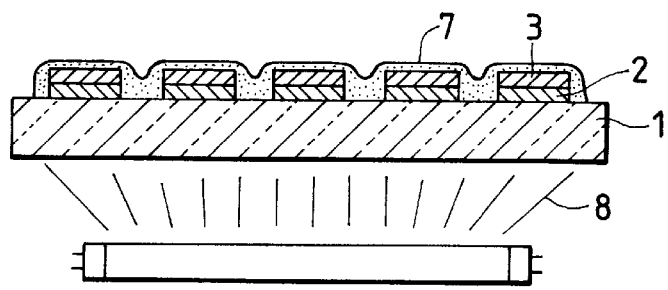
FIG. 3 is a sectional view of the essential portion showing a method of forming a black resist layer and a method of exposing the black resist layer.

④ As shown in FIG. 3, a black resist is coated in an area including at least the area where the color filters 3 are formed from among the color filter formation surface of the transparent board 1, and this black resist is dried to form a black resist layer 7.

⑤ As shown in FIG. 3, exposure light 8 is irradiated onto the black resist layer 7 from the back of the transparent board 1. After a proper time, this exposed transparent board 1 is developed to selectively remove the unexposed photo resist. As a result, as shown in FIG. 1D, a light-shielding film 9 is formed in the gap portion of the color filters 3.

According to the method of manufacturing color filters of this embodiment, by irradiating the high energy beam 4, such as such as a laser beam, an electron beam or an ion beam, the gap portion of the color filters 3 is formed. Therefore, the exposing and developing processes of the photo resist may be managed by performing only the exposing and developing processes of the black resist layer 7. Thus, the steps of manufacturing color filters can be simplified, thereby reducing the cost of manufacturing color filters which are products. When the gap portion of the color filters 3 is formed by irradiating the high energy beam 4, the problem with the printing of the photo resist in the gap portion of the color filters 3 does not occur; therefore, a clear light-shielding film 9 can be formed in the gap portion of the color filters 3, and a color filter having excellent display quality can be manufactured.

[Second Embodiment]

Figure 4:
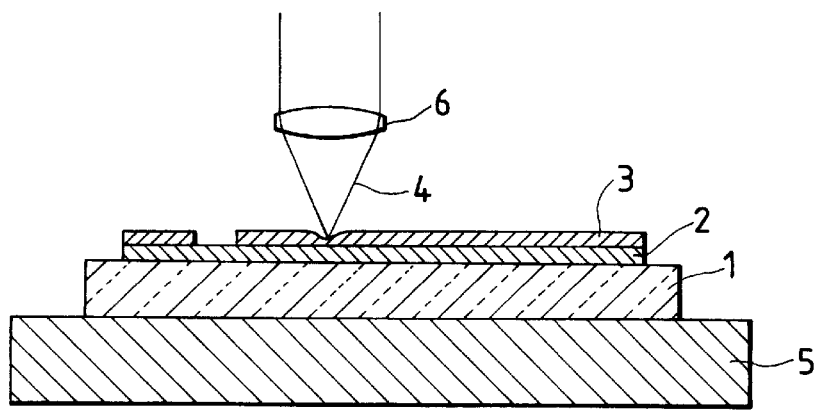
FIG. 4 is a sectional view of the essential portion showing a state in which a high energy beam is scanned in the method of manufacturing color filters in accordance with a second embodiment of the present invention.

According to the method of manufacturing color filters in accordance with this embodiment, in the step (step ③ in the first embodiment) of irradiating a high energy beam, in place of a construction in which both the transparent electrodes 2 and the color filters 3 are removed, as shown in FIG. 4, only the color filters 3 are selectively removed. The selective removal of the color filters 3 can be performed by appropriately adjusting the intensity of the high energy beam 4 irradiated from the irradiation head 6. Since the other steps are the same as those of the first embodiment, an explanation thereof is omitted to avoid duplication of description.

The method of manufacturing color filters in accordance with this embodiment has, in addition to the above-described advantages, advantages that, since the transparent electrodes 2 are made to remain as they are without being cut, charging of static electricity can be avoided during washing and rubbing in the LCD process, and display variations or damages of oriented films caused by the occurrence of static electricity can be prevented.

[Third Embodiment]

Next, as a third embodiment, a high energy beam for partially removing color filters will be described.

Although the method of manufacturing color filters in accordance with the third embodiment are substantially the same as that of the above-described first and second embodiments, here, a description will be given including the overlapping portions with reference to FIGS. 1A, 1B, 1C, 1D, 3, 5, and 6.

Initially, as shown in FIG. 1A, by patterning ITO on one surface of the transparent board 1 made of glass, a plurality of transparent electrodes 2 in a straight line are coated at fixed intervals.

Next, as shown in FIG. 1B, color filters 3 for Red (R), Green (G), and Blue (B) are stacked on the plurality of transparent electrodes 2 in a predetermined array sequence by using means for electrodeposition, dyeing, or printing. In this embodiment, the sequence in which the color filters 3 of three colors for Red (R), Green (G), and Blue (B) are arrayed is made as follows from the left side: for example, Red (R), Green (G), Blue (B), Red (R), Green (G), Blue (B), Red (R), . . . . After the color filters 3 of three colors are respectively stacked on the plurality of transparent electrodes 2, the transparent board 1 is calcined at approximately 250° C., and the color filters 3 are solidified.

Figure 6:
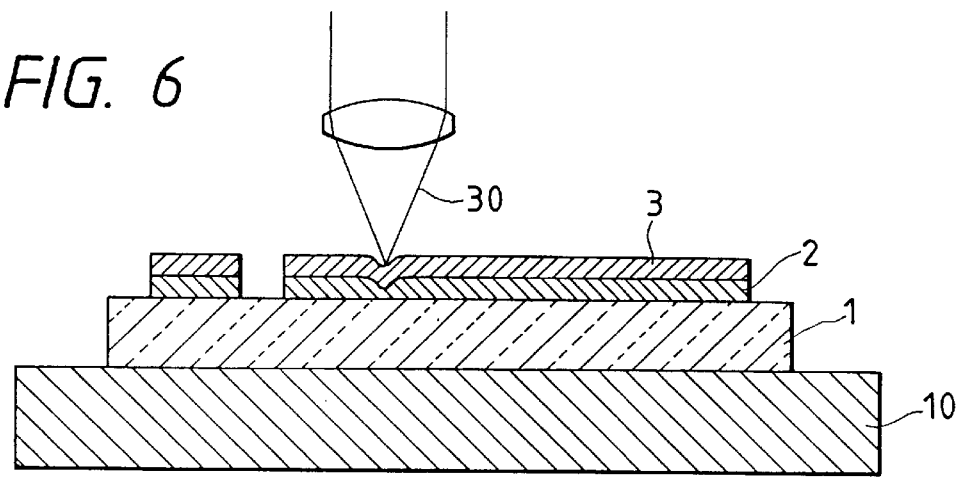
FIG. 6 is a sectional view illustrating a state in which laser light is irradiated onto color filter elements on the transparent board in the manufacturing steps shown in FIGS. 1A to 1D.
Figure 8:
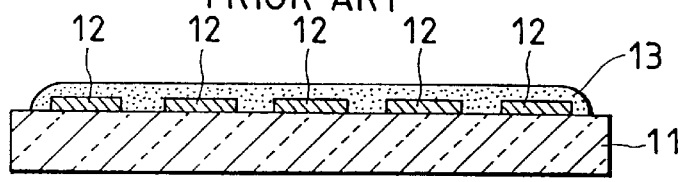
FIG. 8 is a sectional view of the essential portion illustrating a state in which a photo resist layer is formed.
Figure 9:
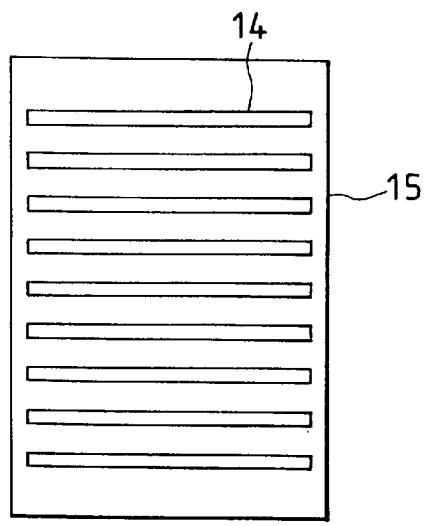
FIG. 9 is a plan view of a mask.
Figure 10:
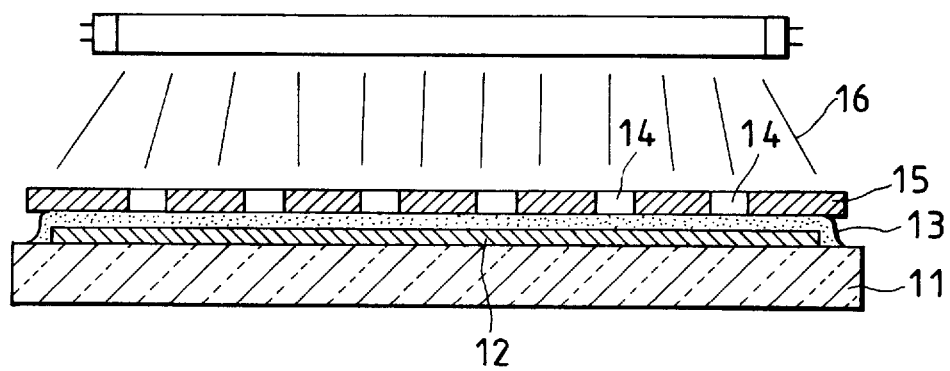
FIG. 10 is a sectional view of the essential portion illustrating a method of exposing the photo resist layer.
Figure 11:
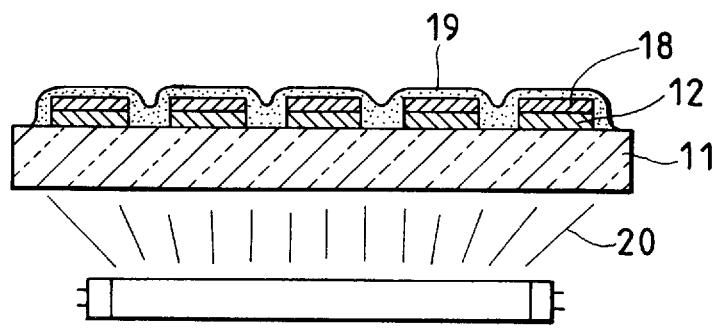
FIG. 11 is a sectional view of the essential portion showing a method of forming a black resist layer and a method of exposing the black resist layer.

Next, as shown in FIG. 6, laser light with a wavelength of 380 nm or less, for example, laser light 30 having a third harmonic (wavelength: 355 nm) of laser light generated from a solid YIG laser, is scanned and irradiated from a direction intersecting at right angles to the plurality of transparent electrodes 2 at fixed intervals, so that the transparent electrodes 2 and the color filters 3 in the portion where the laser light 30 is scanned and irradiated are removed as a result of an occurrence of thermal deformation thereof (melting, evaporation or sublimation). Also in this case, the laser light 30 is scanned and irradiated in such a way that the transparent board 1 is placed on a movable table 10, an irradiation head (with no reference numeral in the figure) for the laser light 30 is placed so as to face the transparent electrodes 2 and the color filters 3 of the transparent board 1, the movable table 10 is intermittently driven at fixed intervals in a direction intersecting at right angles to the plurality of transparent electrodes 2, and at the same time, in synchronization with the intermittent driving of the movable table 10, laser light is irradiated from the irradiation head for the laser light 30. By partially removing the transparent electrodes 2 and the color filters 3 as described above, as shown in FIG. 1C, a color filter having a plurality of mutually spaced color filter elements is formed on the transparent board 1.

Then, as shown in FIG. 3, a black resist is coated on the transparent board 1 including the area thereof where a plurality of color filters 3 are placed, and the coated black resist is dried to form the black resist layer 7. Thereafter, a light source for exposure is placed on the other surface of the transparent board 1, the exposure light 8 is irradiated from this light source for exposure to the black resist layer 7 through the transparent board 1. After the exposure light 8 is irradiated, the transparent board 1 is developed using distilled water or the like, the portion of the unexposed black resist layer 7, namely, that portion of the black resist layer 7 overlapping each color filter 3 is selectively removed, and thus, as shown in FIG. 1D, a color filter having a light-shielding film formed of the black resist layer 7 provided so as to surround the respective color filters 3 is formed.

Figure 5:
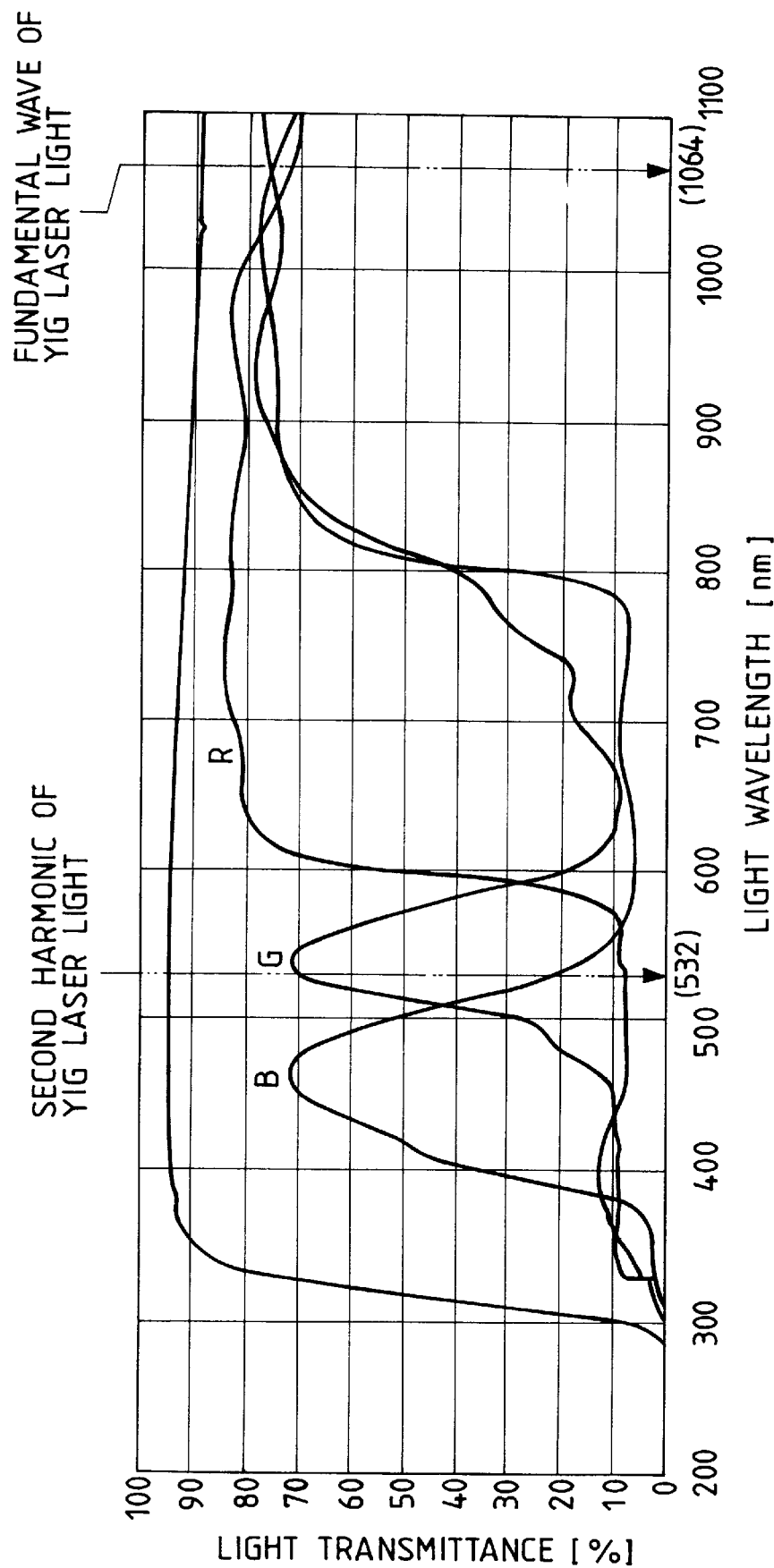
FIG. 5 is a characteristic diagram showing the relationship between light wavelength and light transmittance in the transparent board and the color filter elements for Red (R), Green (G), and Blue (B)

Here, as shown in FIG. 5, the transparent board 1 made of glass has characteristics such that the transparent board 1 shows light transmittance of 0% (namely, all the light is reflected) with respect to light with a short wavelength of 280 nm or less, shows light transmittance which sharply increases as the wavelength becomes long with respect to light with a wavelength from approximately 280 to approximately 350 nm, and shows light transmittance exceeding 90% (namely, most of the light is transmitted) with respect to light with a wavelength longer than approximately 350 nm. The color filter 3 for Red (R) has characteristics such that the color filter 3 for Red (R) shows light transmittance of 0% with respect to light with a wavelength shorter than approximately 300 nm, light transmittance of 10% or thereabouts with respect to light with a wavelength in a range from approximately 300 nm to approximately 550 nm, and shows light transmittance of 80% or thereabouts with respect to light with a wavelength longer than approximately 630 nm. The color filter 3 for Green (G) has characteristics such that the color filter 3 for Green (G) shows light transmittance of 0% with respect to light with a wavelength shorter than approximately 300 nm, light transmittance of 10% or thereabouts with respect to light with a wavelength in a range from approximately 300 nm to approximately 450 nm, shows a peak of light transmittance of approximately 70% with respect to light with a wavelength of approximately 540 nm, and shows light transmittance exceeding 70% with respect to light with a wavelength of approximately 860 nm. The color filter 3 for Blue (B) has characteristics such that the color filter 3 for Blue (B) shows light transmittance of 0% with respect to light with a wavelength shorter than approximately 300 nm, light transmittance of 10% or thereabouts with respect to light with a wavelength in a range from approximately 300 nm to approximately 380 nm, shows a peak of light transmittance of approximately 70% with respect to light with a wavelength of approximately 460 nm, and shows light transmittance exceeding 70% with respect to light with a wavelength of approximately 850 nm.

In this case, in the method of manufacturing color filters in accordance with this embodiment, in a case where the laser light 30 is scanned and irradiated to the color filters 3 in order to partially remove the color filters 3, as the laser light, the laser light 30 with a short wavelength of 380 nm or less is used. Therefore, the light transmittance of the laser light 30 with a short wavelength of 380 nm or less with respect to the color filters 3 for Red (R), Green (G), and Blue (B) is 10% or less in each case, as shown in FIG. 5. The laser light 30 with a short wavelength of 380 nm or less is substantially uniformly reflected in the color filters 3 for Red (R), Green (G), and Blue (B), and, as a result, the removal (cutting) width of the color filters 3 for Red (R), Green (G), and Blue (B) by the laser light with a short wavelength of 380 nm or less is the same. Therefore, the sizes of the color filters 3 for Red (R), Green (G), and Blue (B) are the same.

As described above, according to the method of manufacturing color filters in accordance with this embodiment, since the sizes of the color filters 3 for Red (R), Green (G), and Blue (B) are the same, the processing quality of color filters is very good, and therefore a color filter having excellent display quality can be manufactured.

Although this embodiment describes an example in which a third harmonic (wavelength: 355 nm) of laser light from a solid YIG laser is used to obtain laser light with a short wavelength of 380 nm or less, the laser light 30 with a wavelength of 380 nm or less is not limited to the above-described example, and another laser, for example, a fourth harmonic (wavelength: 266 nm) of laser light from a solid YIG laser, a gas excimer laser (wavelength: from 193 nm to 351 nm), or a gas argon ion laser (wavelength: from 351 nm to 380 nm) may be used.

This embodiment describes a case in which laser light with a short wavelength of 380 nm or less is used as the laser light 30. In a case where, in particular, laser light with a short wavelength of 280 nm or less is used as the laser light 30, as shown in FIG. 5, the laser light 30 with a short wavelength of 280 nm or less does not enter (light transmittance: 0%) the transparent board (glass board) 1 from one surface of the transparent board (glass board) 1. Therefore, an undesirable situation can be prevented from occurring such that the laser light 30 entering the transparent board (glass board) 1 is reflected on the other surface of the transparent board (glass board) 1, this reflected laser light 30 is irradiated onto another color filter 3, and a part of the color filters 3 is removed. Thus, it is possible to manufacture color filters having higher processing quality.

In addition, if color filters obtained by the above-described manufacturing method are used to construct a liquid-crystal display device which makes a color display as has already been known, it is possible to obtain a liquid-crystal display device capable of reproducing an image having excellent display quality.

As has been described up to this point, according to the present invention, since a gap portion of color filters is formed by irradiating a high energy beam, such as a laser beam, an electron beam or an ion beam of a YIG laser, the exposing and developing processes of a photo resist may be managed by performing only the exposing and developing processes of a black resist layer. Thus, the steps of manufacturing color filters can be simplified, thereby reducing the cost of manufacturing color filters which are products. Also, when the gap portion of the color filters is formed by irradiating a high energy beam, the problem with the printing of the photo resist in the gap portion of the color filters does not occur; therefore, a clear light-shielding film can be formed in the gap portion of the color filters, and a color filter having excellent display quality can be manufactured.

According to the method of manufacturing color filters in accordance with the present invention, when the color filters 3 for Red (R), Green (G), and Blue (B) are partially removed by common laser light, laser light with a short wavelength, to be specific, the laser light 30 with a short wavelength of 380 nm or less is used. Therefore, the light transmittance of the laser light 30 with a short wavelength of 380 nm or less with respect to the color filters 3 for Red (R), Green (G), and Blue (B) is respectively approximately 10% or less, and the laser light 30 with a short wavelength of 380 nm or less is substantially uniformly reflected in the color filters 3 for Red (R), Green (G), and Blue (B). When the laser light 30 with a short wavelength of 380 nm or less is substantially uniformly reflected in the color filters 3 for Red (R), Green (G), and Blue (B), the removal (cutting) width of the color filters 3 for Red (R), Green (G), and Blue (B) by the laser light with a short wavelength of 380 nm or less is the same.

Therefore, the sizes of the color filters 3 for Red (R), Green (G), and Blue (B) can be made to be the same, thereby the processing quality of color filters is not caused to decrease, and color filters having excellent display quality can be manufactured.

The liquid-crystal display device of the present invention has the advantage that use of color filters having excellent processing quality makes it possible to reproduce an image having excellent display quality.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A method of manufacturing color filters, comprising the steps of:

forming a plurality of parallel strips of color filter material on transparent electrodes, said transparent electrodes being disposed on a transparent board at a predetermined interval, a first group of said parallel strips being a first color, a second group of said parallel strips being a second color, and a third group of said parallel strips being a third color, wherein each of the first, second and third groups has a light transmittance defined by a unique light transmittance function which varies with respect to a wavelength of incident light;

intermittently moving said transparent board over a plurality of fixed pitch intervals while scanning a laser light along an exposed surface of the transparent board in a direction perpendicular to the parallel strips of color filter material wherein said intermittent movement of said transparent board is synchronized with said scanning of said laser light, wherein after each of the intermittent movements, the laser light having a wavelength produces a light transmittance of 10% or less through the first, second and third groups of parallel strips of color filter material such that portions of the color filter material having a uniform width are removed, thereby forming a plurality of color filters arranged in a matrix on the transparent board; and forming a light-shield film on the transparent board between the plurality of color filters.

2. The method of manufacturing color filters to claim 1, wherein the transparent board has a light transmittance which varies in accordance with a wavelength of incident light and completely reflects the incident light when the wavelength is 280 nm or less, and wherein the step of scanning the laser light includes using a laser having a wavelength of 280 nm or less such that said laser light is completely reflected from the first surface of the transparent board to re-irradiate and remove portions of the color filter material.

3. The method of claim 1, wherein the step of scanning the laser light includes using a laser having sufficient energy such that portions of said transparent electrode are removed with said portions of the color filter material.

4. The method of claim 1, wherein the laser light has a wavelength of 380 nm or less.

5. The method of claim 1, wherein the laser light has a wavelength of 280 nm or less.

* * * * *